UNITED STATES PATENT OFFICE.

WILHELM HEIMSOTH AND ADOLF FLÜGGE, OF HANOVER, GERMANY.

PROCESS OF MANUFACTURING BUILDING-BLOCKS.

SPECIFICATION forming part of Letters Patent No. 639,037, dated December 12, 1899.

Application filed November 11, 1898. Serial No. 696,168. (No specimens.)

*To all whom it may concern:*

Be it known that we, WILHELM HEIMSOTH, engineer, and ADOLF FLÜGGE, apothecary, subjects of the Emperor of Germany, residing at No. 10 Blumenstrasse, Hanover, Germany, have invented certain new and useful Improvements in Processes for Manufacturing Material for Building-Blocks from Mud; and we do hereby declare the following to be a full, clear, and exact description of the same.

The mud which settles in great quantities in the sea at the mouths of rivers has been hitherto found to be of little value except for use as fertilizing material, because it contains lime and nitrogenous substances. We have discovered by chemical analysis that the said mud, dried at 220° Fahrenheit, leaves after such drying about ninety-four per cent. of solid ingredients and after being refined with water and muriatic acid about ninety per cent. of solid ingredients, consisting, chiefly, of silicic acid and argillaceous earth.

This invention is a process of manufacturing materials for building-stones from such mud in a dried and calcined condition.

In the use of mud as material for stones for building purposes experiments made by us have proven that it is not an indifferent matter what materials are employed in making the mixture. Gypsum, cement, clay, and sand cannot be used, because the stone if it is not calcined is not impervious to water. In order to produce a stone impervious to water, it is necessary to mix slaked lime with the material, and this combination produces a compact crystallized mass out of which the stones are formed.

The process of manufacturing the stones is as follows, to wit: The mud is dried until it has the consistency of a paste. Then it is mixed with about five per cent. of slaked lime, more or less, measured by weight, according to the quality of the mud, and is molded into stones; or the mud is dried completely in the open air, pulverized and kneaded with four to five per cent. of slaked lime and river-water in the form of paste, and molded into stones. The stones are then dried by exposure to the air. The air-dried stone, which has become impervious to water after this process, is then washed in water to extract the salts contained in the material. After the extraction of the salts the stones are dried again slowly in the air and baked afterward at 220° Fahrenheit.

Another stone, superior to this in hardness and durability, is produced by a five-per-cent. addition of sulfate of iron crystallized and pulverized. In this manner ferric oxid and gypsum are formed and give it a greater tenacity and strength.

These stones by reason of their light specific weight (1.10 to 1.15) can be used instead of other artificial stones, (such as hollow stones, gypseous stones, plates, &c.) The addition of peat, wooden materials, sawdust, celluloid-shavings, or other light materials to the mixture will reduce the weight still further.

If the stone is employed for outer walls of buildings it must be made impervious to water by burning. The product is very light and strong and is preferable to clay stones and brick-bats because its weight is only half so great.

Having thus described our invention, we claim—

The herein-described process of producing a material for building-blocks, which consists in recovering the mud found in the sea at the mouths of rivers and drying the same by exposure to the air, adding slaked lime in the proportion of about five per cent. of the mud, more or less, and river-water to give the mass the consistency of paste, then adding crystallized sulfate of iron and a light substance, molding the mass into blocks and drying said blocks by exposure in the open air; washing the blocks in water to remove the salts contained in the material, drying the same slowly in the air, and thereafter baking them at a temperature of 220° Fahrenheit substantially as described.

In witness whereof we have hereunto set our hands in presence of two witnesses.

WILHELM HEIMSOTH.
ADOLF FLÜGGE.

Witnesses:
KIRKE LATHROP,
LEONORE KASCH.